(12) United States Patent
Enayet et al.

(10) Patent No.: US 11,755,658 B2
(45) Date of Patent: Sep. 12, 2023

(54) INTELLIGENT BUFFERING OF QUERIES FROM A MOBILE APPLICATION

(71) Applicant: Nuvolo Technologies Corporation, Jersey City, NJ (US)

(72) Inventors: Nabil Enayet, Jersey City, NJ (US); Tejas Yadav, West Haven, CT (US); Tao Ye, Garfield, NJ (US)

(73) Assignee: Nuvolo Technologies Corporation, Paramus, NJ (US)

( * ) Notice: Subject to any disclaimer, the term of this patent is extended or adjusted under 35 U.S.C. 154(b) by 104 days.

(21) Appl. No.: 16/439,304

(22) Filed: Jun. 12, 2019

(65) Prior Publication Data

US 2019/0377761 A1 Dec. 12, 2019

Related U.S. Application Data

(60) Provisional application No. 62/684,018, filed on Jun. 12, 2018.

(51) Int. Cl.
*G06F 16/903* (2019.01)

(52) U.S. Cl.
CPC .............. *G06F 16/90335* (2019.01)

(58) Field of Classification Search
None
See application file for complete search history.

(56) References Cited

U.S. PATENT DOCUMENTS

| | | | |
|---|---|---|---|
| 2007/0067352 A1* | 3/2007 | McCall | G06F 16/217 |
| 2007/0299812 A1* | 12/2007 | Salch | G06F 16/217 |
| 2009/0307300 A1* | 12/2009 | Guedalia | G06F 9/54 |
| | | | 709/202 |
| 2010/0049890 A1* | 2/2010 | Best | G06Q 50/16 |
| | | | 710/73 |
| 2011/0153662 A1* | 6/2011 | Stanfill | G06F 16/24532 |
| | | | 707/774 |
| 2014/0129588 A1* | 5/2014 | Chi | G06F 16/90335 |
| | | | 707/769 |
| 2015/0347179 A1* | 12/2015 | Barraclough | G06F 16/957 |
| | | | 718/103 |

(Continued)

FOREIGN PATENT DOCUMENTS

KR 101132270 B1 * 4/2012 ............ H04W 72/12

*Primary Examiner* — Augustine K. Obisesan
(74) *Attorney, Agent, or Firm* — Mintz Levin Cohn Ferris Glovsky and Popeo, P.C.

(57) ABSTRACT

Methods, systems, and apparatus, including computer programs encoded on a computer storage medium for intelligently buffering queries from a mobile application. In one aspect, the method may include receiving, by an application programming interface executing on a mobile device, multiple queries, from different software widgets executing on a mobile application, for data from a database stored on the mobile device, determining, by the application programming interface, a level of priority for each query of the multiple queries, providing, by the application programming interface, each of the multiple queries for storage in a data buffer until processing resources of the mobile device are available to process one or more of the multiple queries, and processing each query of the multiple queries against the database stored on the mobile device based on the assigned level of priority.

20 Claims, 3 Drawing Sheets

(56) References Cited

U.S. PATENT DOCUMENTS

| | | | |
|---|---|---|---|
| 2016/0065673 A1* | 3/2016 | Mehra | H04L 67/10 709/203 |
| 2017/0235725 A1* | 8/2017 | Ghosh | G06F 9/4881 718/103 |

* cited by examiner

INTELLIGENT BUFFERING OF QUERIES FROM A MOBILE APPLICATION

BACKGROUND

Mobile applications for mobile devices have exploded in popularity and are increasingly complex. Such applications can cause strain on computing resources of the mobile device.

SUMMARY

In one aspect, an application programming interface is configured to dynamically determine a level of priority for respective queries that originate from widgets of a mobile application interface. The application programming interface can manage execution of the requests against a database stored on the mobile device based on the determined priority.

Conventional systems for implementing mobile applications can fail when two or more respective widgets of a plurality of widgets provided for output via a user interface each initiates a query for data from a database. The queries can collide with one another when attempting to access a database, can cause the performance of the mobile application to lag. For example, in some implementations, the collisions of the queries can cause the mobile application to freeze and even crash.

According to one innovative aspects of the present disclosure, a method of intelligently buffering queries from a mobile application is disclosed. The method may include actions of receiving, by an application programming interface executing on a mobile device, multiple queries, from different software widgets executing on a mobile application, for data from a database stored on the mobile device, determining, by the application programming interface, a level of priority for each query of the multiple queries, providing, by the application programming interface, each of the multiple queries for storage in a data buffer until processing resources of the mobile device are available to process one or more of the multiple queries; and processing each query of the multiple queries against the database stored on the mobile device based on the assigned level of priority.

Other versions include corresponding systems, apparatus, and computer program to perform the actions of methods, encoded on computer storage devices.

These and other versions may optionally include one or more of the following features. For instance, in some implementations, determining, by the application programming interface, a level of priority for each query of the multiple queries may include determining a level of priority for each query of the multiple queries based on a timestamp associated with each query of the multiple queries.

In some implementations, the timestamp associated with each query of the multiple queries indicates a time that the query was originated by a particular software widget of the different software widgets.

In some implementations, determining, by the application programming interface, a level of priority for each query of the multiple queries may include determining a level of priority for each query of the multiple queries based on (i) a time stamp associated with the query and (ii) whether or not a particular software widget of the different software widgets that originated the query is visible on the display of the mobile device.

In some implementations, determining a level of priority for each query of the multiple queries based on (i) a time stamp associated with the query and (ii) whether or not a particular software widget of the different software widgets that originated the query is visible on the display of the mobile device may include determining a first level of priority for one or more first queries that originate from a software widget that is currently visible on the display of the mobile device, wherein the first level of priority prioritizes the one or more first queries for execution over one or more second queries that originate from a software widget that is not visible on the display of the mobile device.

In some implementations, the method may include adjusting, by the application programming interface, a level of priority that is associated with at least one query that is stored in the data buffer.

In some implementations, adjusting, by the application programming interface, a level of priority that is associated with at least one query that is stored in the data buffer may include determining, by the application programming interface, that a first software widget that was previously not visible on the display of the mobile device is now visible on the display of the mobile device. determining, by the application programming interface, that a particular query that originated from the first software widget is stored in the data buffer, and adjusting the level of priority associated with the particular query in a manner that promotes the particular query for execution over one or more other queries of the multiple queries that originated from a widget that is not visible on the display of the user device.

In some implementations, adjusting, by the application programming interface, a level of priority that is associated with at least one query that is stored in the data buffer ma include determining, by the application programming interface, that a second software widget that was visible on the display of the mobile device is no longer visible on the display of the mobile device, determining, by the application programming interface, that a particular query that originated from the second software widget is stored in the data buffer, and adjusting the level of priority associated with the particular query in a manner that demotes the particular query for execution after each of the other queries of the multiple queries stored in the data buffer that originated from a software widget that is visible on the display of the mobile device.

These and other aspects of the present disclosure are described in more detail in the accompanying drawings and detailed description.

DETAILED DESCRIPTION

Figure 1:
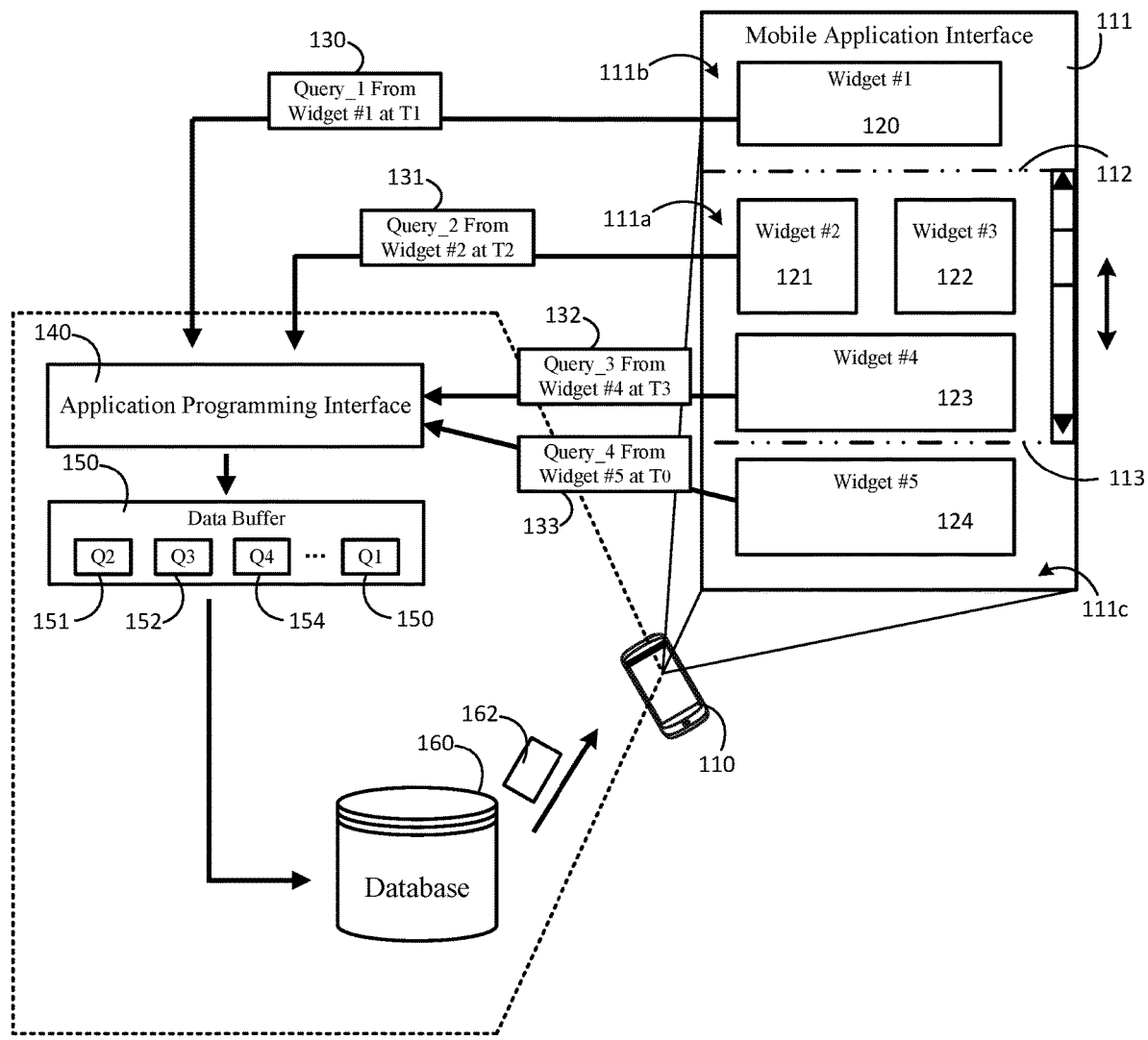
FIG. 1 shows a system for intelligently buffering queries from a mobile application.

Queries originating from a mobile device can be buffered in an intelligent manner by dynamically determining a level of priority for substantially simultaneous queries. At any given time, multiple queries may originate from a mobile device. Such queries may appear to be substantially simultaneous such as when a mobile application is initially opened by a user of a mobile device and the mobile application originates multiple queries to populate fields in respective portions of a user interface. Such substantially simultaneous queries, when executed against a database that is maintained on the mobile device, can cause collisions to occur since all of the substantially simultaneous queries are submitted to the database at substantially the same time. These collisions can result in poor performance of a mobile application originating the substantially simultaneous queries such as (i) the mobile application running slowly on the mobile device, (ii) the mobile application freezing, (iii) the mobile application crashing, or a combination thereof.

In some implementations, an application programming interface (API) can be configured to dynamically determine a level of priority for substantially simultaneous queries that originate from an application running on a mobile device. In this way, the substantially simultaneous queries are handled in a manner that often avoids collisions. The level of priority may be determined based on a variety of factors including, for example, a time stamp that when the query was originated, rating of a component of the application that originated the query, whether a component of the application that originated the query is visible for on a user interface of the mobile device, or the like. The components of the mobile application may include, for example, a widget, portal, or the like that provides data corresponding to a particular topic. A widget, portal, or the like may include software code that, when executed by the mobile device, establishes a portion of a graphical user interface that is dedicated to display data retrieved from one or more particular data sources that are associated with the widget or portal. An interface mobile application, all of which may not be output in the display of a mobile device at the same time, may include multiple widgets at any particular time that are each originating queries from a database at the same time. Accordingly, in some implementations, one or more widgets may each simultaneously, or near simultaneously, originate a query.

In use, the application programming interface provides the queries to a data buffer and then manages execution of the requests against a database stored on the mobile device based on the determined level of priority for each query stored in the buffer. In some implementations, multiple priority rankings may be associated with a query originated by the application, and priority ranking order of operations may be applied to rank the queries. In some implementations, the ranking of the queries within the buffer may be adjusted based on a determination that one or more factors associated with a level of priority for a buffered query has changed.

These techniques are described with respect to a mobile application installed on a mobile device that originates queries that can be assigned a level-of-priority and buffered busing an application programming interface on the mobile device prior to execution of a query against a database stored on a mobile device. However, other implementations can be used. For example, one or more of the application programming interface, the database, or both may be stored at a location that is remote from the mobile device.

FIG. 1 shows a system 100 for intelligently buffering queries from a mobile application. The system 100 may include a mobile device 110, a mobile application interface 111, an application programming interface 140, a data buffer 150, and a database 160. The mobile device 110 may include any type of user device such as a smartphone, a tablet, a laptop, a desktop, or the like.

A user of the mobile device 110 may input a command that instructs the mobile device 110 to open a mobile application that displays a mobile application interface 111 in the display of the mobile device 110. The mobile application interface is configured to display one or more software widgets 120, 121, 122, 123, 124 that each display a particular type of data that is stored in the database 160. Each respective software widget may be configured to display a different type or category of data that is stored in the database 160. In some implementations, for example, the database 160 may be a mirrored copy of one or more portions of an enterprise database whose master copy is stored on a remote server.

Each software widget 120, 121, 122, 123, 124 may present data that is associated with a particular aspect of the enterprise. For example, if the enterprise is a company that specializes in the sale of goods, each respective software widget may provide data describing different subdivisions of the pharmaceutical company such as budget data related to each product that the company sells. Alternatively, or in addition, each widget may display data corresponding to sales in particular regions such as North America, South America, Europe, Asia, or the like. However, the software widgets 120, 121, 122, 123, 124 of the mobile application may be used to display any category of data from any type of enterprise.

In some implementations, the data in a remote enterprise database upon which the database 160 is mirrored from may be changing in real-time (or near real-time). For example, if the enterprise were a financial institution such as a bank that issues credit cards, the numbers representing currency values of accounts maintained by the bank may be constantly changing as purchases and credits are made to each respective account. The database 160 may be repeatedly synchronized with the enterprise database so that the database 160 maintains an up-to-date mirrored copy of one or more portions of the remote enterprise database.

The software widgets 120, 121, 122, 123, 124 can be configured to detect that the data in the database 160 that is associated with the software widget has changed. Once such a change, or a threshold amount of such changes, are detected by a software widget, the software widget may generate a query such as Query_1 130, Query_2 131, Query_3 132, Query_4 133 to request the updated data for display in the mobile application interface 111. Alternatively, or in addition, one or more the queries 130, 131, 132, 133 may be generated in response to user interaction with the mobile device 110. For example, a user of the user device 110 may manually initiate generation of one or more queries from a software widget by selecting a refresh icon that is associated with the software widget.

An application programming interface 140 can receive the queries 130, 131, 132, 133 that originated from respective software widgets 120, 121, 122, 123, 124 of the mobile application executing on the user device 110. The application programming interface 140 may include a software module that can execute on the mobile device 110 and function as middleware that conceptually lies between the mobile application that produced the mobile application interface 111 and the database 160. In some implementations, the application programming interface 140 and the database 160 are resident on the mobile device 110. In other implementations, one or more of the application programming interface 140 and the database 160 may be installed on a computer that is remote from the user device 110. In implementations where the application programming interface 140, the database 160, or both, are located on a computer that is remote from the user device 110, the user device 110, or any other software or hardware module of the user device 110, may communicate with the application programming interface 140, the database 160, or both, using one or more networks such as a LAN, a WAN, a cellular network, the Internet, or a combination thereof. The application programming interface 140 is configured to analyze each received query 130, 131, 132, 133 and determine a level of priority for each received query 130, 131, 132, 133 based on a variety of priority factors.

The priority factors may include query attributes, software widget attributes, or a combination thereof. Query attributes may include any type of data that is descriptive of the received query such as a timestamp indicating when the query was originated by a software widget, an identifier indicating the software widget that originated the query, whether the query was generated at the instruction of a software widget, whether the query was generated at the instruction of a user of the user device, or the like. Software widget attribute may include, for example, whether the software widget is currently visible on the display of the user device 110, a rate at which the software widget is used relative to other software widgets provided by the mobile application, whether a user has identified the software widget as a favorite software widget, a rate of change of the data that is displayed by the software widget, or the like.

The application programming interface 140 stores the queries 130, 131, 132, 133 in the data buffer 150. The data buffer 150 may include a portion of the user device's 110 main memory (e.g., RAM) that is dedicated for use as a data buffer 150. Alternatively, the data buffer 150 may include any other storage location of the user device 110. Alternatively, the data buffer 150 may include any storage device that is configured to cache queries that are being buffered for execution against the database 160.

The application programming interface 140 also generates data describing a level of priority for each query 130, 131, 132, 133. The application programming interface 140 can store the generated data describing the level of priority for each query 130, 131, 132, 133. In some implementations, the data describing the level of priority for each query 130, 131, 132, 133 may be stored in the data buffer 150. Alternatively, in other implementations, the data describing the level of priority for each query 130, 131, 132, 133 may be stored in a different location of the mobile device. The level of priority associated with each query 130, 131, 132, 133 provides data that can be used by the mobile device 110 in order to determine which query 130, 131, 132, 133, of the plurality of queries 130, 131, 132, 133 should be selected from the data buffer 150 for execution against the database 160.

In some implementations, the application programming interface 140 may assign a default order of preference between each of the plurality of priority factors associated with the queries 130, 131, 132, 133 stored in the data buffer 150. For example, the default order of preference may give greater weight to certain priority factors such as whether a software widget that issued a query is currently visible on the display of the mobile device 110 may have be awarded preference over other priority factors such as time the query was originated. However, in some implementations, one or more user configurable settings may dictate a different level of preference for each respective priority factor. For example, a user configured setting may specify that all queries should be executed in an order that of the time that the query was originated by a software widget.

The mobile device 110 may then access each of the queries in the buffer 140 for execution against the database 160 in an order that is based on the level of priority that the application programming interface assigned to the respective queries. This intelligent buffering improves the performance of the mobile device 100 by preventing queries query collisions and avoiding mobile application lock-up based on such query collisions.

For example, with reference to FIG. 1, each of software widgets 120, 121, 122, 123, 124 may each originate at least one query between a time T0 and a time T3. In this example, Query_1 130 is originated from software widget 120 at time T1, a Query_2 131 is originated by software widget 121 at time T2, Query_3 is originated by a software widget 123 at time T3, and Query_4 is originated by a software widget 124 at time T0. In this example. Software widget 122 does not originate a query.

The application programming interface 140 may receive the queries and determine a level of priority for each query 130, 131, 132, 133. In this example, the application programming interface 140 can be configured to associate data with each query 130, 131, 132, 133 that indicates the time each respective query was originated by a software widget 120, 121, 122, 123, 124.

In addition, application programming interface 140 also associates data with the respective queries that indicate whether the software widget 120, 121, 122, 123, 124 from which the each query was originated is currently visible in the display of the mobile device 110. In FIG. 1, for example, the visible portion or the display of the user device 110 is between the upper display boundary 112 and lower display boundary 113. Accordingly, in the example of FIG. 1, software widgets 121, 122, 123 are currently visible on the display of the user device 110 and software widgets 120, 124 are not currently visible on the display of the user device 110.

The application programming interface 140 may adjust an initial priority level of the queries 130, 131, 132, 133 based on data indicating whether the software widget that originated the queries is visible in the display of the user device 110. For example, the initial priority level of the queries 130, 131, 132, 133 may be based on the time each respective query 130, 131, 132, 133 were originated by a software widget 120, 121, 122, 123, 124. However, this initial priority level may be adjusted based on current visibility of the software widgets in the display of the user device 110 to promote execution of query 131 and 132 ahead of queries 130, 134 because queries 131, 132 are from software widgets that are currently visible in the display of the user device 111. Query 131 is set for execution before query 132 because, though both queries originated from software widgets that are currently visible on the display of the user device 110 defined by the upper boundary 112 and lower boundary 113, query 2 (131) was originated before query 3 (132), based on query 2's (131) earlier time stamp T2.

Accordingly, the queries set forth in the example of FIG. 1 may be buffered so that query 2 (131) is executed first 151, query 3 (132) is executed second 152, query 4 (134) is executed third 154, and query 1 (130) is executed last 150. However, this execution order need not be static one it is determined. For example, a user may scroll the mobile application interface 111 so that software widget 123 scrolls below the lower boundary 113 of the visible portion of the display of the user device 110 and software widget 120 scrolls past the upper boundary 112 and into the visible portion of the display of the user device 110. In such instances, the application programming interface can adjust the execution order of the query 130 would be executed before any of the other queries that have been executed yet. This is because query 130 would now have the earliest time stamp T1 of any query that originated from a currently visible software widget.

As the queries are executed, data responsive to the query can be provided to the mobile application interface 111 for output in the display of the user device 111. Though the example described herein discusses prioritizing queries from currently visible software widgets over queries that are not visible in the display of a user device 111, the present disclosure need not be so limited. For example, in some implementations, a user may adjust settings in a user profile requests giving preference to a different priority factor. Similarly, default configurations specifying the order preference of priority factors may be set to different order preferences than those described herein.

Figure 2:
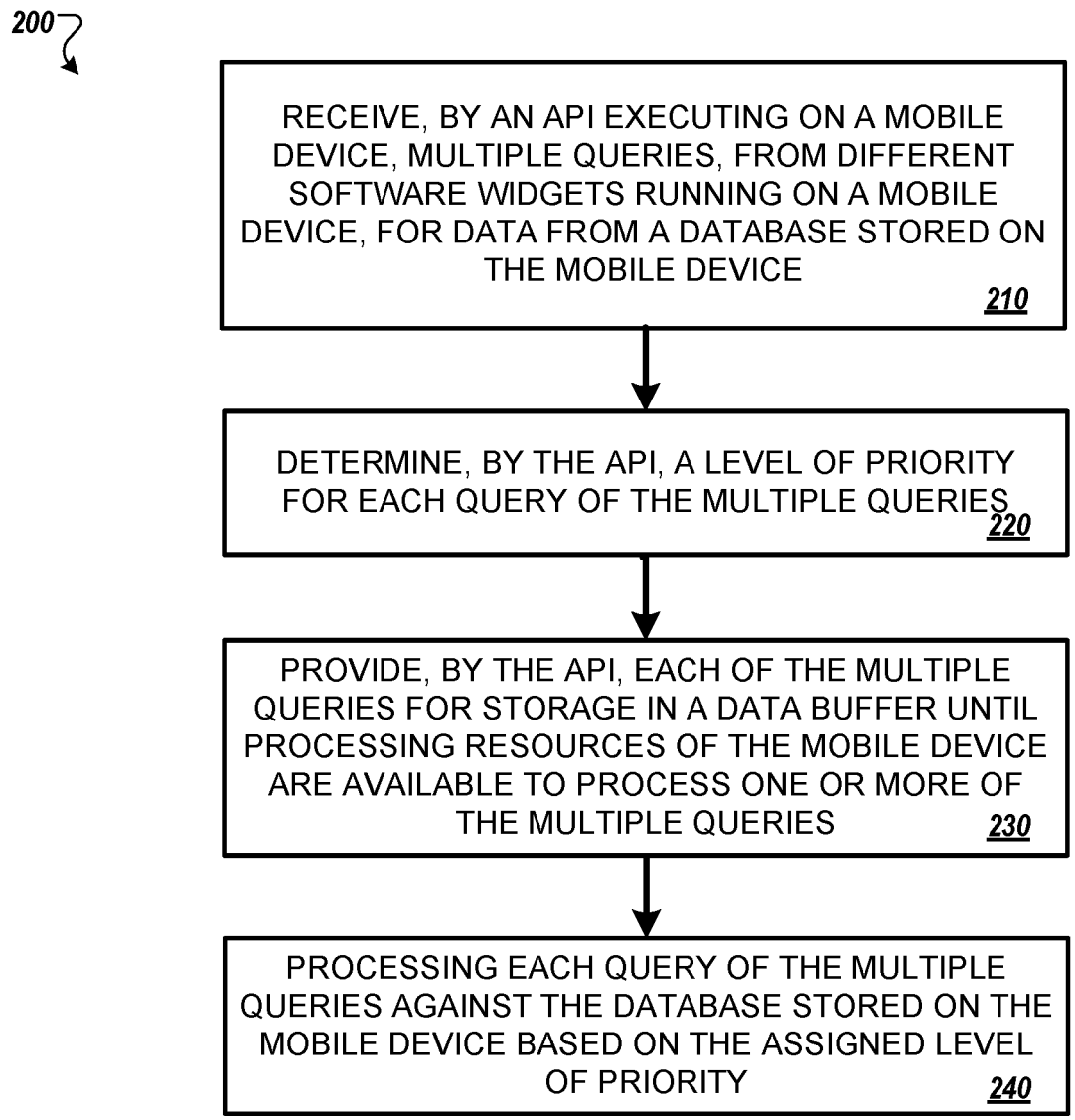
FIG. 2 is a flowchart of a process for intelligently buffering queries from a mobile application.

FIG. 2 is a flowchart of a process 200 for intelligently buffering queries from a mobile application. Generally, the process 200 may include, for example, receiving, by an application programming interface (API) executing on a mobile device, multiple queries, from different software widgets running on a mobile device, for data from a database stored on the mobile device (210), determining, by the application programming interface (API), a level of priority for each query of the multiple queries (220), providing, by the application programming interface (API), each of the multiple queries for storage in a data buffer until processing resources of the mobile device are available to process one or more of the multiple queries (230), and processing each query of the multiple queries against the database stored on the mobile device based on the assigned level of priority (240).

In more detail, a user device may begin performance of the process 200 by receiving 210, using an application programming interface executing on the mobile device, multiple queries, from different software widgets running on a mobile device, for data from a database stored on the mobile device. Each of the queries may be associated with one or more queries attributes or one or more software widget attributes.

The mobile device may use the application programming interface to determine 220 a level of priority for each query of the multiple queries. The level of priority may be determined based on the query attributes, the software widget attributes, or a combination thereof. The query attributes may include any type of data that is descriptive of the received query such as a timestamp indicating when the query was originated by a software widget, an identifier indicating the software widget that originated the query, whether the query was generated at the instruction of a software widget, whether the query was generated at the instruction of a user of the user device, or the like. The software widget attribute may include, for example, whether the software widget is currently visible on the display of the user device, a rate at which the software widget is used relative to other software widgets provided by the mobile application, whether a user has identified the software widget as a favorite software widget, a rate of change of the data that is displayed by the software widget, or the like.

The mobile device can use the application programming interface to provide 230 each of the multiple queries for storage in a data buffer until processing resources of the mobile device are available to process one or more of the multiple queries. Processing resources may become sufficiently available, for example, when the mobile device is able to execute one or more of the multiple queries without a database collision.

In response to determining that that processing resource of the mobile device are sufficiently available, the mobile device can process 240 each query of the multiple queries against the database stored on the mobile device based on the assigned level of priority.

Figure 3:
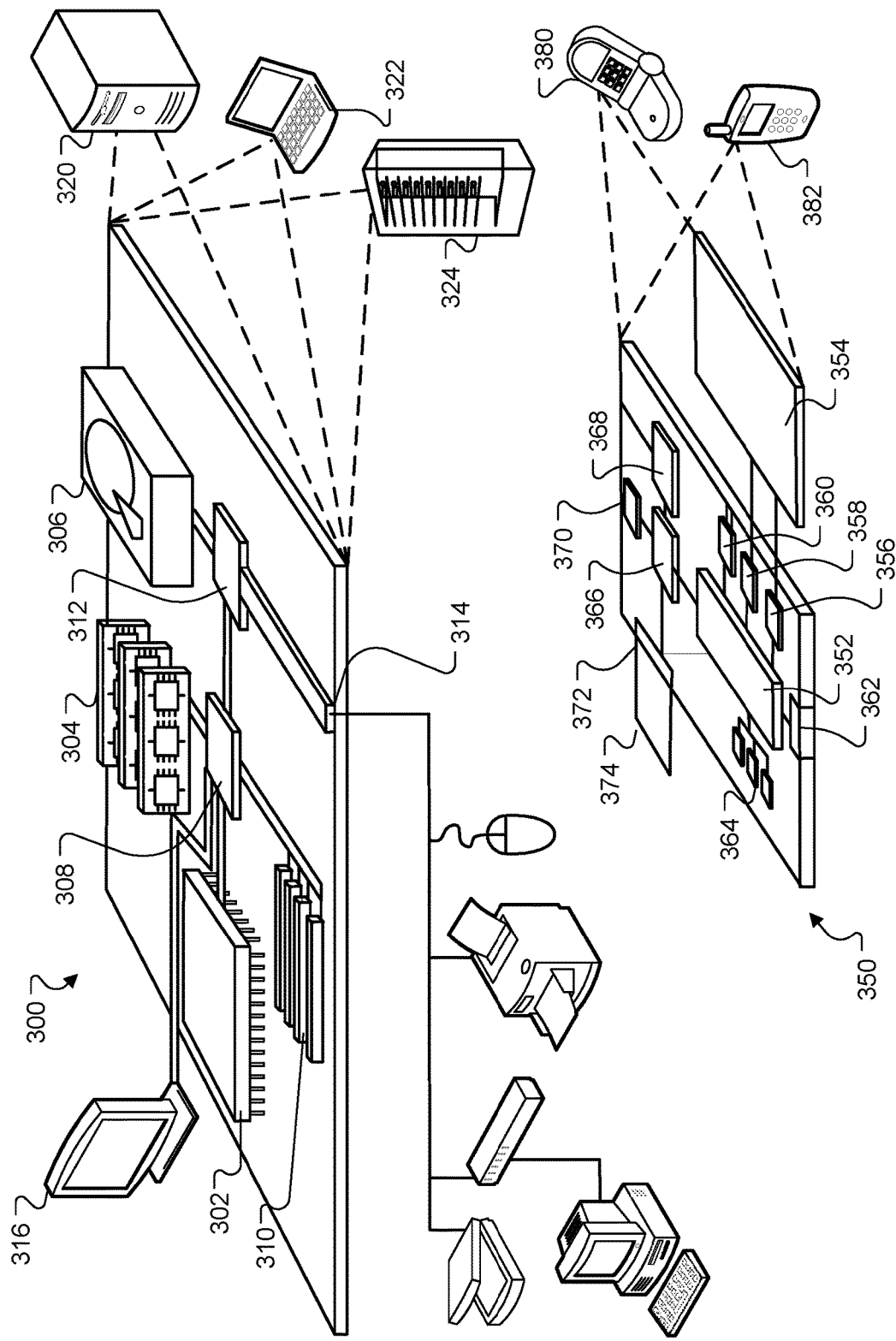
FIG. 3 shows system components that can be used to implement a system for intelligently buffering queries from a mobile application.

FIG. 3 shows system components that can be used to implement a system for intelligently buffering queries from a mobile application.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. For example, the mobile device 110 of FIG. 1 may be an example of a computing device 350. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 308, a high-speed interface 308 connecting to memory 304 and high-speed expansion ports 310, and a low speed interface 312 connecting to low speed bus 314 and storage device 308. Each of the components 302, 304, 308, 308, 310, and 312, are interconnected using various busses, and can be mounted on a common motherboard or in other manners as appropriate. The processor 302 can process instructions for execution within the computing device 300, including instructions stored in the memory 304 or on the storage device 308 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 308 is capable of providing mass storage for the computing device 300. In one implementation, the storage device 308 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 308, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 308 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chip set of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provide in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provide as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 370 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

The invention claimed is:

1. A method comprising:
   determining, by an application programming interface, software widgets executing on respective mobile applications on a mobile device;
   receiving, by the application programming interface executing on the mobile device, a plurality of queries, from the software widgets, for data from a database stored on the mobile device, the plurality of queries comprising two or more substantially simultaneous queries submitted to the database at substantially a same time, the two or more substantially simultaneous queries colliding with one another when attempting to access the database;
   determining, by the application programming interface, a software widget attribute of each respective software widget of the software widgets that submitted the two or more substantially simultaneous queries to the database at substantially the same time, the software widget attribute comprising a visibility, on a display of the mobile device, of a respective software widget of the software widgets that originated a respective query when the plurality of queries are received and a rate at which the respective software widget is used relative to other software widgets of the software widgets that submitted the two or more substantially simultaneous queries to the database at substantially the same time;
   determining, by the application programming interface, a level of priority for each query of the plurality of queries, wherein determining the level of priority of each of the two or more substantially simultaneous queries submitted to the database at substantially the same time is based on an instruction origin to generate the respective query and the software widget attribute of the respective software widget associated to the respective query, the instruction origin being indicative of an original timing of the respective query and a source of the instruction origin;
   providing, by the application programming interface, each of the plurality of queries for storage in a data buffer until processing resources of the mobile device are available to process one or more of the plurality of queries; and
   processing each query of the plurality of queries against the database stored on the mobile device based on the level of priority.

2. The method of claim 1, wherein determining, by the application programming interface, the level of priority for each query of the plurality of queries comprises:
   determining the level of priority for each query of the plurality of queries based on a timestamp associated with each query of the plurality of queries.

3. The method of claim 2, wherein the timestamp associated with each query of the plurality of queries indicates a time that the query was originated by a particular software widget of the software widgets.

4. The method of claim 1, wherein determining, by the application programming interface, the level of priority for each of the two or more substantially simultaneous queries of the plurality of queries comprises:
  determining the level of priority for each of the two or more substantially simultaneous queries of the plurality of queries based on a time stamp associated with each of the two or more substantially simultaneous queries, wherein each time stamp indicates a time a respective query of the two or more substantially simultaneous queries was originated by a particular software widget of the software widgets.

5. The method of claim 4, wherein the determining the level of priority for each of the two or more substantially simultaneous queries of the plurality of queries based on at least the time stamp associated with each of the two or more substantially simultaneous queries further comprises:
  determining a first level of priority for one or more first queries of the two or more substantially simultaneous queries that originate from a software widget that is currently visible on the display of the mobile device and associated with an earlier time stamp, wherein the first level of priority prioritizes the one or more first queries for execution over one or more second queries of the two or more substantially simultaneous queries that originate from a software widget that is not visible on the display of the mobile device.

6. The method of claim 1, further comprising:
  adjusting, by the application programming interface, the level of priority that is associated with at least one query that is stored in the data buffer.

7. The method of claim 6, wherein adjusting, by the application programming interface, the level of priority that is associated with at least one of the two or more substantially simultaneous queries that is stored in the data buffer comprises:
  determining, by the application programming interface, that a first software widget that was previously not visible on the display of the mobile device is now visible on the display of the mobile device;
  determining, by the application programming interface, that a particular query that originated from the first software widget is stored in the data buffer; and
  adjusting the level of priority associated with the particular query in a manner that promotes the particular query for execution over one or more other queries of the plurality of queries that originated from a widget that is not visible on the display of the mobile device.

8. The method of claim 6, wherein adjusting, by the application programming interface, the level of priority that is associated with at least one query that is stored in the data buffer comprises:
  determining, by the application programming interface, that a second software widget that was visible on the display of the mobile device is no longer visible on the display of the mobile device;
  determining, by the application programming interface, that a particular query that originated from the second software widget is stored in the data buffer; and
  adjusting the level of priority associated with the particular query in a manner that demotes the particular query for execution after each of other queries of the plurality of queries stored in the data buffer that originated from a software widget that is visible on the display of the mobile device.

9. A system comprising:
  one or more computers and one or more storage devices storing instructions that are operable, when executed by the one or more computers, to cause the one or more computers to perform operations comprising:
    determining, by an application programming interface, software widgets executing on respective mobile applications on a mobile device;
    receiving, by the application programming interface executing on the mobile device, a plurality of queries, from the software widgets, for data from a database stored on the mobile device, the plurality of queries comprising two or more substantially simultaneous queries submitted to the database at substantially a same time, the two or more substantially simultaneous queries colliding with one another when attempting to access the database;
    determining, by the application programming interface, a software widget attribute of each respective software widget of the software widgets that submitted the two or more substantially simultaneous queries to the database at substantially the same time, the software widget attribute comprising a visibility, on a display of the mobile device, of a respective software widget of the software widgets that originated a respective query when the plurality of queries are received and a rate at which the respective software widget is used relative to other software widgets of the software widgets that submitted the two or more substantially simultaneous queries to the database at substantially the same time;
    determining, by the application programming interface, a level of priority for each query of the plurality of queries, wherein determining the level of priority of each of the two or more substantially simultaneous queries submitted to the database at substantially the same time is based on an instruction origin to generate the respective query and the software widget attribute of the respective software widget associated to the respective query, the instruction origin being indicative of an original timing of the respective query and a source of the instruction origin;
    providing, by the application programming interface, each of the plurality of queries for storage in a data buffer until processing resources of the mobile device are available to process one or more of the plurality of queries; and
    processing each query of the plurality of queries against the database stored on the mobile device based on the level of priority.

10. The system of claim 9, wherein determining, by the application programming interface, the level of priority for each query of the plurality of queries comprises:
  determining the level of priority for each query of the plurality of queries based on a timestamp associated with each query of the plurality of queries.

11. The system of claim 10, wherein the timestamp associated with each query of the plurality of queries indicates a time that the query was originated by a particular software widget of the software widgets.

12. The system of claim 9, wherein determining, by the application programming interface, the level of priority for each of the two or more substantially simultaneous queries of the plurality of queries comprises:
  determining the level of priority for each of the two or more substantially simultaneous queries of the plurality of queries based on a time stamp associated with each of the two or more substantially simultaneous queries, wherein each time stamp indicates a time a respective query of the two or more substantially simultaneous queries was originated by a particular software widget of the software widgets.

13. The system of claim 12, wherein the determining the level of priority for each of the two or more substantially simultaneous queries of the plurality of queries based on at least the time stamp associated with each of the two or more substantially simultaneous queries further comprises:
determining a first level of priority for one or more first queries of the two or more substantially simultaneous queries that originate from a software widget that is currently visible on the display of the mobile device and associated with an earlier time stamp, wherein the first level of priority prioritizes the one or more first queries for execution over one or more second queries of the two or more substantially simultaneous queries that originate from a software widget that is not visible on the display of the mobile device.

14. The system of claim 9, the operations further comprising:
adjusting, by the application programming interface, the level of priority that is associated with at least one query that is stored in the data buffer.

15. The system of claim 14, wherein adjusting, by the application programming interface, the level of priority that is associated with at least one of the two or more substantially simultaneous queries that is stored in the data buffer comprises:
determining, by the application programming interface, that a first software widget that was previously not visible on the display of the mobile device is now visible on the display of the mobile device;
determining, by the application programming interface, that a particular query that originated from the first software widget is stored in the data buffer; and
adjusting the level of priority associated with the particular query in a manner that promotes the particular query for execution over one or more other queries of the plurality of queries that originated from a widget that is not visible on the display of the mobile device.

16. The system of claim 14, wherein adjusting, by the application programming interface, the level of priority that is associated with at least one query that is stored in the data buffer comprises:
determining, by the application programming interface, that a second software widget that was visible on the display of the mobile device is no longer visible on the display of the mobile device;
determining, by the application programming interface, that a particular query that originated from the second software widget is stored in the data buffer; and
adjusting the level of priority associated with the particular query in a manner that demotes the particular query for execution after each of other queries of the plurality of queries stored in the data buffer that originated from a software widget that is visible on the display of the mobile device.

17. A non-transitory computer-readable medium storing software comprising instructions executable by one or more computers which, upon such execution, cause the one or more computers to perform operations comprising:
determining, by an application programming interface, software widgets executing on respective mobile applications on a mobile device;
receiving, by the application programming interface executing on the mobile device, a plurality of queries, from the software widgets, for data from a database stored on the mobile device, the plurality of queries comprising two or more substantially simultaneous queries submitted to the database at substantially a same time, the two or more substantially simultaneous queries colliding with one another when attempting to access the database;
determining, by the application programming interface, a software widget attribute of each respective software widget of the software widgets that submitted the two or more substantially simultaneous queries to the database at substantially the same time, the software widget attribute comprising a visibility, on a display of the mobile device, of a respective software widget of the software widgets that originated a respective query when the plurality of queries are received and a rate at which the respective software widget is used relative to other software widgets of the software widgets that submitted the two or more substantially simultaneous queries to the database at substantially the same time;
determining, by the application programming interface, a level of priority for each query of the plurality of queries, wherein determining the level of priority of each of the two or more substantially simultaneous queries submitted to the database at substantially the same time is based on an instruction origin to generate the respective query and the software widget attribute of the respective software widget associated to the respective query, the instruction origin being indicative of an original timing of the respective query and a source of the instruction origin;
providing, by the application programming interface, each of the plurality of queries for storage in a data buffer until processing resources of the mobile device are available to process one or more of the plurality of queries; and
processing each query of the plurality of queries against the database stored on the mobile device based on the level of priority.

18. The non-transitory computer-readable medium of claim 17, wherein determining, by the application programming interface, the level of priority for each query of the plurality of queries comprises:
determining the level of priority for each query of the plurality of queries based on a timestamp associated with each query of the plurality of queries.

19. The non-transitory computer-readable medium of claim 18, wherein the timestamp associated with each query of the plurality of queries indicates a time that the query was originated by a particular software widget of the software widgets.

20. The non-transitory computer-readable medium of claim 17, wherein determining, by the application programming interface, the level of priority for each of the two or more substantially simultaneous queries of the plurality of queries comprises:
determining the level of priority for each of the two or more substantially simultaneous queries of the plurality of queries based on a time stamp associated with each of the two or more substantially simultaneous queries, wherein each time stamp indicates a time a respective query of the two or more substantially simultaneous queries was originated by a particular software widget of the software widgets.

* * * * *